(12) United States Patent
Watson et al.

(10) Patent No.: US 7,792,278 B2
(45) Date of Patent: Sep. 7, 2010

(54) INTEGRATION OF CONTACT CENTER SURVEYS

(75) Inventors: Joseph Watson, Alpharetta, GA (US); Thomas Lyerly, Marietta, GA (US); Nick McLean, Duluth, GA (US)

(73) Assignee: Verint Americas Inc., Melville, NY (US)

( * ) Notice: Subject to any disclaimer, the term of this patent is extended or adjusted under 35 U.S.C. 154(b) by 1195 days.

(21) Appl. No.: 11/395,992

(22) Filed: Mar. 31, 2006

(65) Prior Publication Data

US 2007/0233549 A1    Oct. 4, 2007

(51) Int. Cl.
*H04M 3/00* (2006.01)
(52) U.S. Cl. ...................... 379/266.1; 705/11
(58) Field of Classification Search .......... 705/10, 705/14, 1; 379/266.1
See application file for complete search history.

(56) References Cited

U.S. PATENT DOCUMENTS

| | | | |
|---|---|---|---|
| 3,594,919 A | 7/1971 | De Bell et al. |
| 3,705,271 A | 12/1972 | De Bell et al. |
| 4,510,351 A | 4/1985 | Costello et al. |
| 4,684,349 A | 8/1987 | Ferguson et al. |
| 4,694,483 A | 9/1987 | Cheung |
| 4,763,353 A | 8/1988 | Canale et al. |
| 4,815,120 A | 3/1989 | Kosich |
| 4,924,488 A | 5/1990 | Kosich |
| 4,953,159 A | 8/1990 | Hayden et al. |
| 5,016,272 A | 5/1991 | Stubbs et al. |
| 5,101,402 A | 3/1992 | Chiu et al. |
| 5,117,225 A | 5/1992 | Wang |
| 5,210,789 A | 5/1993 | Jeffus et al. |
| 5,239,460 A | 8/1993 | LaRoche |
| 5,241,625 A | 8/1993 | Epard et al. |
| 5,267,865 A | 12/1993 | Lee et al. |
| 5,299,260 A | 3/1994 | Shaio |
| 5,311,422 A | 5/1994 | Loftin et al. |
| 5,315,711 A | 5/1994 | Barone et al. |
| 5,317,628 A | 5/1994 | Misholi et al. |
| 5,347,306 A | 9/1994 | Nitta |
| 5,388,252 A | 2/1995 | Dreste et al. |
| 5,396,371 A | 3/1995 | Henits et al. |
| 5,432,715 A | 7/1995 | Shigematsu et al. |
| 5,465,286 A | 11/1995 | Clare et al. |
| 5,475,625 A | 12/1995 | Glaschick |

(Continued)

FOREIGN PATENT DOCUMENTS

EP    0453128 A2    10/1991

(Continued)

OTHER PUBLICATIONS

"Customer Spotlight: Navistar International," Web pae, unverified print date of Apr. 1, 2002.

(Continued)

*Primary Examiner*—Creighton Smith (57) ABSTRACT

Systems and methods for integrating contact center surveys are provided. In this regard, a representative method comprises: obtaining performance data pertaining to a contact center agent, the agent being designated to assist a customer of the contact center; providing a survey to the customer; receiving survey data responsive to the survey and corresponding to interaction with the customer by the contact center agent; and correlating the performance data with the survey data.

23 Claims, 7 Drawing Sheets

U.S. PATENT DOCUMENTS

| | | | |
|---|---|---|---|
| 5,485,569 A | 1/1996 | Goldman et al. |
| 5,491,780 A | 2/1996 | Fyles et al. |
| 5,499,291 A | 3/1996 | Kepley |
| 5,535,256 A | 7/1996 | Maloney et al. |
| 5,572,652 A | 11/1996 | Robusto et al. |
| 5,577,112 A | 11/1996 | Cambray et al. |
| 5,590,171 A | 12/1996 | Howe et al. |
| 5,597,312 A | 1/1997 | Bloom et al. |
| 5,619,183 A | 4/1997 | Ziegra et al. |
| 5,696,906 A | 12/1997 | Peters et al. |
| 5,717,879 A | 2/1998 | Moran et al. |
| 5,721,842 A | 2/1998 | Beasley et al. |
| 5,742,670 A | 4/1998 | Bennett |
| 5,748,499 A | 5/1998 | Trueblood |
| 5,778,182 A | 7/1998 | Cathey et al. |
| 5,784,452 A | 7/1998 | Carney |
| 5,790,798 A | 8/1998 | Beckett, II et al. |
| 5,796,952 A | 8/1998 | Davis et al. |
| 5,809,247 A | 9/1998 | Richardson et al. |
| 5,809,250 A | 9/1998 | Kisor |
| 5,825,869 A | 10/1998 | Brooks et al. |
| 5,835,572 A | 11/1998 | Richardson, Jr. et al. |
| 5,862,330 A | 1/1999 | Anupam et al. |
| 5,864,772 A | 1/1999 | Alvarado et al. |
| 5,884,032 A | 3/1999 | Bateman et al. |
| 5,907,680 A | 5/1999 | Nielsen |
| 5,918,214 A | 6/1999 | Perkowski |
| 5,923,746 A | 7/1999 | Baker et al. |
| 5,933,811 A | 8/1999 | Angles et al. |
| 5,944,791 A | 8/1999 | Scherpbier |
| 5,948,061 A | 9/1999 | Merriman et al. |
| 5,958,016 A | 9/1999 | Chang et al. |
| 5,964,836 A | 10/1999 | Rowe et al. |
| 5,978,648 A | 11/1999 | George et al. |
| 5,982,857 A | 11/1999 | Brady |
| 5,987,466 A | 11/1999 | Greer et al. |
| 5,990,852 A | 11/1999 | Szamrej |
| 5,991,373 A | 11/1999 | Pattison et al. |
| 5,991,796 A | 11/1999 | Anupam et al. |
| 6,005,932 A | 12/1999 | Bloom |
| 6,009,429 A | 12/1999 | Greer et al. |
| 6,014,134 A | 1/2000 | Bell et al. |
| 6,014,647 A | 1/2000 | Nizzari et al. |
| 6,018,619 A | 1/2000 | Allard et al. |
| 6,035,332 A | 3/2000 | Ingrassia et al. |
| 6,038,544 A | 3/2000 | Machin et al. |
| 6,039,575 A | 3/2000 | L'Allier et al. |
| 6,057,841 A | 5/2000 | Thurlow et al. |
| 6,058,163 A | 5/2000 | Pattison et al. |
| 6,061,798 A | 5/2000 | Coley et al. |
| 6,072,860 A | 6/2000 | Kek et al. |
| 6,076,099 A | 6/2000 | Chen et al. |
| 6,078,894 A | 6/2000 | Clawson et al. |
| 6,091,712 A | 7/2000 | Pope et al. |
| 6,108,711 A | 8/2000 | Beck et al. |
| 6,122,665 A | 9/2000 | Bar et al. |
| 6,122,668 A | 9/2000 | Teng et al. |
| 6,130,668 A | 10/2000 | Stein |
| 6,138,139 A | 10/2000 | Beck et al. |
| 6,144,991 A | 11/2000 | England |
| 6,146,148 A | 11/2000 | Stuppy |
| 6,151,622 A | 11/2000 | Fraenkel et al. |
| 6,154,771 A | 11/2000 | Rangan et al. |
| 6,157,808 A | 12/2000 | Hollingsworth |
| 6,171,109 B1 | 1/2001 | Ohsuga |
| 6,182,094 B1 | 1/2001 | Humpleman et al. |
| 6,195,679 B1 | 2/2001 | Bauersfeld et al. |
| 6,201,948 B1 | 3/2001 | Cook et al. |
| 6,211,451 B1 | 4/2001 | Tohgi et al. |
| 6,225,993 B1 | 5/2001 | Lindblad et al. |
| 6,230,197 B1 | 5/2001 | Beck et al. |
| 6,236,977 B1 | 5/2001 | Verba et al. |
| 6,244,758 B1 | 6/2001 | Solymar et al. |
| 6,282,548 B1 | 8/2001 | Burner et al. |
| 6,286,030 B1 | 9/2001 | Wenig et al. |
| 6,286,046 B1 | 9/2001 | Bryant |
| 6,288,753 B1 | 9/2001 | DeNicola et al. |
| 6,289,340 B1 | 9/2001 | Purnam et al. |
| 6,301,462 B1 | 10/2001 | Freeman et al. |
| 6,301,573 B1 | 10/2001 | McIlwaine et al. |
| 6,324,282 B1 | 11/2001 | McIlwaine et al. |
| 6,347,374 B1 | 2/2002 | Drake et al. |
| 6,351,467 B1 | 2/2002 | Dillon |
| 6,353,851 B1 | 3/2002 | Anupam et al. |
| 6,360,250 B1 | 3/2002 | Anupam et al. |
| 6,370,574 B1 | 4/2002 | House et al. |
| 6,404,857 B1 | 6/2002 | Blair et al. |
| 6,411,989 B1 | 6/2002 | Anupam et al. |
| 6,418,471 B1 | 7/2002 | Shelton et al. |
| 6,459,787 B2 | 10/2002 | McIlwaine et al. |
| 6,487,195 B1 | 11/2002 | Choung et al. |
| 6,493,758 B1 | 12/2002 | McLain |
| 6,502,131 B1 | 12/2002 | Vaid et al. |
| 6,510,220 B1 | 1/2003 | Beckett, II et al. |
| 6,535,909 B1 | 3/2003 | Rust |
| 6,542,602 B1 | 4/2003 | Elazar |
| 6,546,405 B2 | 4/2003 | Gupta et al. |
| 6,560,328 B1 | 5/2003 | Bondarenko et al. |
| 6,583,806 B2 | 6/2003 | Ludwig et al. |
| 6,606,657 B1 | 8/2003 | Zilberstein et al. |
| 6,665,644 B1 | 12/2003 | Kanevsky et al. |
| 6,674,447 B1 | 1/2004 | Chiang et al. |
| 6,683,633 B2 | 1/2004 | Holtzblatt et al. |
| 6,697,858 B1 | 2/2004 | Ezerzer et al. |
| 6,724,887 B1 | 4/2004 | Eilbacher et al. |
| 6,738,456 B2 | 5/2004 | Wrona et al. |
| 6,757,361 B2 | 6/2004 | Blair et al. |
| 6,772,396 B1 | 8/2004 | Cronin et al. |
| 6,775,377 B2 | 8/2004 | McIlwaine et al. |
| 6,792,575 B1 | 9/2004 | Samaniego et al. |
| 6,810,414 B1 | 10/2004 | Brittain |
| 6,820,083 B1 | 11/2004 | Nagy et al. |
| 6,823,384 B1 | 11/2004 | Wilson et al. |
| 6,870,916 B2 | 3/2005 | Henrikson et al. |
| 6,901,438 B1 | 5/2005 | Davis et al. |
| 6,959,078 B1 | 10/2005 | Eilbacher et al. |
| 6,965,886 B2 | 11/2005 | Govrin et al. |
| 2001/0000962 A1 | 5/2001 | Rajan |
| 2001/0032335 A1 | 10/2001 | Jones |
| 2001/0043697 A1 | 11/2001 | Cox et al. |
| 2002/0038363 A1 | 3/2002 | MacLean |
| 2002/0052948 A1 | 5/2002 | Baudu et al. |
| 2002/0065911 A1 | 5/2002 | Von Klopp et al. |
| 2002/0065912 A1 | 5/2002 | Catchpole et al. |
| 2002/0128925 A1 | 9/2002 | Angeles |
| 2002/0143925 A1 | 10/2002 | Pricer et al. |
| 2002/0165954 A1 | 11/2002 | Eshghi et al. |
| 2003/0055883 A1 | 3/2003 | Wiles et al. |
| 2003/0079020 A1 | 4/2003 | Gourraud et al. |
| 2003/0144900 A1 | 7/2003 | Whitmer |
| 2003/0154240 A1 | 8/2003 | Nygren et al. |
| 2004/0100507 A1 | 5/2004 | Hayner et al. |
| 2004/0165717 A1 | 8/2004 | McIlwaine et al. |
| 2005/0131732 A1* | 6/2005 | Potenza ........................ 705/1 |
| 2005/0138560 A1 | 6/2005 | Lee et al. |
| 2006/0265090 A1* | 11/2006 | Conway et al. ............... 700/94 |

FOREIGN PATENT DOCUMENTS

| | | |
|---|---|---|
| EP | 0773687 A2 | 5/1997 |
| EP | 0989720 | 3/2000 |
| GB | 2369263 | 5/2002 |
| WO | WO 98/43380 | 11/1998 |

| | | |
|---|---|---|
| WO | WO 00/16207 | 3/2000 |

OTHER PUBLICATIONS

"DKSystems Integrates QM Perception with OnTrack for Training," Web page, unvereified print date of Apr. 1, 2002, unverified cover date of Jun. 15, 1999.

"OnTrack Online" Delivers New Web Functionality, Web page, unverified print date of Apr. 2, 2002, unverified cover date of Oct. 5, 1999.

"PriceWaterouseCoopers Case Study" The Business Challenge, Web page, unverified cover date of 2000.

Abstract, net.working: "An Online Webliography," *Technical Training* pp. 4-5 (Nov.-Dec. 1998).

Adams et al., "Our Turn-of-the-Century Trend Watch" *Technical Training* pp. 46-47 (Nov./Dec. 1998).

Barron, "The Road to Performance: Three Vignettes," *Technical Skills and Training* pp. 12-14 (Jan. 1997).

Bauer, "Technology Tools: Just-in-Time Desktop Training is Quick, Easy, and Affordable," *Technical Training* pp. 8-11 (May/Jun. 1998).

Beck et al., "Applications of A1 in Education," *AMC Crossroads* vol. 1: 1-13 (Fall 1996) Web page, unverified print date of Apr. 12, 2002.

Benson and Cheney, "Best Practices in Training Delivery," *Technical Training* pp. 14-17 (Oct. 1996).

Bental and Cawsey, "Personalized and Adaptive Systems for Medical Consumer Applications," Communications ACM 45(5): 62-63 (May 2002).

Blumenthal et al., "Reducing Development Costs with Intelligent Tutoring System Shells," pp. 1-5, Web page, unverified print date of Apr. 9, 2002, unverified cover date of Jun. 10, 1996.

Brusilosy et al., "Distributed intelligent tutoring on the Web," Proceedings of the $8^{th}$ World Conference of the AIED Society, Kobe, Japan, Aug. 18-22, pp. 1-9 Web page, unverified print date of Apr. 12, 2002, unverified cover date of Aug. 18-22, 1997.

Brusilovsky and Pesin, ISIS-Tutor: An Intelligent Learning Environment for CD/ISIS Users, @ pp. 1-15 Web page, unverified print date of May 2, 2002.

Brusilovsky, "Adaptive Educational Systems on the World-Wide-Web: A Review of Available Technologies," pp. 1-10, Web Page, unverified print date of Apr. 12, 2002.

Byrnes et al., "The Development of a Multiple-Choice and True-False Testing Environment on the Web," pp. 1-8, Web page, unverified print date of Apr. 12, 2002, unverified cover date of 1995.

Calvi and DeBra, "Improving the Usability of Hypertext Courseware through Adaptive Linking," *ACM*, unknown page numbers (1997).

Coffey, "Are Performance Objectives Really Necessary?" *Technical Skills and Training* pp. 25-27 (Oct. 1995).

Cohen, "Knowledge Management's Killer App," pp. 1-11, Web page, unverified print date of Sep. 12, 2002, unverified cover date of 2001.

Cole-Gomolski, "New Ways to manage E-Classes," *Computerworld* 32(48):4344 (Nov. 30, 1998).

Cross: "Sun Microsystems—the SunTAN Story," Internet Time Group 8 (©2001).

De Bra et al., "Adaptive Hypermedia: From Systems to Framework," *ACM* (2000).

De Bra, "Adaptive Educational Hypermedia on the Web," *Communications ACM* 45(5):60-61 (May 2002).

Dennis and Gruner, "Computer Managed Instruction at Arthur Andersen & Company: A Status Report," *Educational Technical* pp. 7-16 (Mar. 1992).

Diessel et al., "Individualized Course Generation: A Marriage Between CAL and ICAL," *Computers Educational* 22(1/2) 57-65 (1994).

Dyreson, "An Experiment in Class Management Using the World-Wide Web," pp. 1-12, Web page, unverified print date of Apr. 12, 2002.

E Learning Community, "Excellence in Practice Award: Electronic Learning Technologies," *Personal Learning Network* pp. 1-11, Web page, unverified print date of Apr. 12, 2002.

Eklund and Brusilovsky, "The Value of Adaptivity in Hypermedia Learning Environments: A Short Review of Empirical Evidence," pp. 1-8, Web page, unverified print date of May 2, 2002.

*e-Learning the future of learning*, THINQ Limited, London, Version 1.0 (2000).

Eline, "A Trainer's Guide to Skill Building," *Technical Training* pp. 34-41 (Sep./Oct. 1998).

Eline, "Case Study: Briding the Gap in Canada's IT Skills," *Technical Skills and Training* pp. 23-25 (Jul. 1997).

Eline "Case Study: IBT's Place in the Sun," *Technical Training* pp. 12-17 (Aug./Sep. 1997).

Fritz, "CB templates for productivity: Authoring system templates for trainers," *Emedia Professional* 10(8):6678 (Aug. 1997).

Fritz, "ToolBook II: Asymetrix's updated authoring software tackles the Web," *Emedia Professional* 10(20): 102106 (Feb. 1997).

Gibson et al., "A Comparative Analysis of Web-Based Testing and Evaluation Systems," pp. 1-8, Web page, unverified print date of Apr. 11, 2002.

Halberg and DeFiore, "Curving Toward Performance: Following a Hierarchy of Steps Toward a Performance Orientation," *Technical Skills and Training* pp. 9-11 (Jan. 1997).

Harsha, "Online Training 'Sprints' Ahead," *Technical Training* pp. 27-29 (Jan./Feb. 1999).

Heideman, "Training Technicians for a High-Tech Future: These six steps can help develop technician training for high-tech work," pp. 11-14 (Feb./Mar. 1995).

Heideman, "Writing Performance Objectives Simple as A-B-C (and D)," *Technical Skills and Training* pp. 5-7 (May/Jun. 1996).

Hollman, "Train Without Pain: The Benefits of Computer-Based Training Tools," pp. 1-11, Web page, unverified print date of Mar. 20, 2002, unverified cover date of Jan. 1, 2000.

Klein, "Command Decision Training Support Technology," Web page, unverified print date of Apr. 12, 2002.

Koonce, "Where Technology and Training Meet," *Technical Training* pp. 10-15 (Nov./Dec. 1998).

Kursh, "Going the distance with Web-based training," *Training and Development* 52(3): 5053 (Mar. 1998).

Larson, "Enhancing Performance Through Customized Online Learning Support," *Technical Skills and Training* pp. 2527 (May/Jun. 1997).

Linton, et al. "OWL: A Recommender System for Organization-Wide Learning," *Educational Technical Society* 3(1): 62-76 (2000).

Lucadamo and Cheney, "Best Practices in Technical Training," *Technical Training* pp. 21-26 (Oct. 1997).

McNamara, "Monitoring Solutions: Quality Must be Seen and Heard," *Inbound/Outbound* pp. 66-67 (Dec. 1989).

Merrill, "The New Component Design Theory: Instruction design for courseware authoring," *Instructional Science* 16:19-34 (1987).

Minton-Eversole, "IBT Training Truths Behind the Hype," *Technical Skills and Training* pp. 15-19 (Jan. 1997).

Mizoguchi, "Intelligent Tutoring Systems: The Current State of the Art," Trans. IEICE E73(3):297-307 (Mar. 1990).

Mostow and Aist, "The Sounds of Silence: Towards Automated Evaluation of Student Learning a Reading Tutor that Listens" *American Association for Artificial Intelligence*, Web page, unknown date Aug. 1997.

Mullier et al., "A Web base Intelligent Tutoring System," pp. 1-6, Web page, unverified print date of May 2, 2002.

Nash, Database Marketing, 1993, pp. 158-165, 172-185, McGraw Hill, Inc. USA.

Nelson et al. "The Assessment of *End-User Training Needs*," *Communications ACM* 38(7):27-39 (Jul. 1995).

O'Herron, "CenterForce Technologies' CenterForce Analyzer," Web page unverified print date of Mar. 2, 2002, unverified cover date of Jun. 1, 1999.

O'Roark, "Basic Skills Get a Boost," Technical Training pp. 10-13 (Jul./Aug. 1998).

Pamphlet, On Evaluating Educational Innovations[1], authored by Alan Lesgold, unverified cover date of Mar. 5, 1998.

Papa et al., "A Differential Diagnostic Skills Assessment and Tutorial Tool," *Computer Education* 18(1-3):45-50 (1992).

PCT International Search Report, International Application No. PCT/US03/02541, mailed May 12, 2003.

Phaup, "New Software Puts Computerized Tests on the Internet: Presence Corporation announces breakthrough Question Mark™ Web Product," Web page, unverified print date of Apr. 1, 2002.

Phaup, "QM Perception™ Links with Integrity Training's WBT Manager™ to Provide Enhanced Assessments of Web-Based Courses," Web page, unverified print date of Apr. 1, 2002, unverified cover date of Mar. 25, 1999.

Phaup, "Question Mark Introduces Access Export Software," Web page, unverified print date of Apr. 2, 2002, unverified cover date of Mar. 1, 1997.

Phaup, "Question Mark Offers Instant Online Feedback for Web Quizzes and Questionnaires: University of California assist with Beta Testing, Server scripts now available on high-volume users," Web page, unverified print date of Apr. 1, 2002, unverified cover date of May 6, 1996.

Piskurich, Now-You-See-'Em, Now-You-Don't Learning Centers, *Technical Training* pp. 18-21 (Jan./Feb. 1999).

Read, "Sharpening Agents' Skills," pp. 1-15, Web page, unverified print date of Mar. 20, 2002, unverified cover date of Oct. 1, 1999.

Reid, "On Target: Assessing Technical Skills," *Technical Skills and Training* pp. 6-8 (May/Jun. 1995).

Stormes, "Case Study: Restructuring Technical Training Using ISD," *Technical Skills and Training* pp. 2326 (Feb./Mar. 1997).

Tennyson, "Artificial Intelligence Methods in Computer-Based Instructional Design," Journal of Instructional Development 7(3): 17-22 (1984).

The Editors, Call Center, "The Most Innovative Call Center Products We Saw in 1999," Web page, unverified print date of Mar. 20, 2002, unverified cover date of Feb. 1, 2000.

Tinoco et al., "Online Evaluation in WWW-based Courseware," *ACM* pp. 194-198 (1997).

Uiterwijk et al., "The virtual classroom," *InfoWorld* 20(47):6467 (Nov. 23, 1998).

Unknown Author, "Long-distance learning," *InfoWorld* 20(36):7676 (1998).

Untitled, 10th Mediterranean Electrotechnical Conference vol. 1 pp. 124-126 (2000).

Watson and Belland, "Use of Learner Data in Selecting Instructional Content for Continuing Education," *Journal of Instructional Development* 8(4):29-33 (1985).

Weinschenk, "Performance Specifications as Change Agents," *Technical Training* pp. 12-15 (Oct. 1997).

Witness Systems promotional brochure for eQuality entitled "Building Customer Loyalty Through Business-Driven Recording of Multimedia Interactions in your Contact Center," (2000).

Aspect Call Center Product Specification, "Release 2.0", Aspect Telecommuications Corporation, May 23, 1998 798.

Metheus X Window Record and Playback, XRP Features and Benefits, 2 pages Sep. 1994 LPRs.

"Keeping an Eye on Your Agents," Call Center Magazine, pp. 32-34, Feb. 1993 LPRs & 798.

Anderson: Interactive TVs New Approach, The Standard, Oct. 1, 1999.

Ante, *Everything You Ever Wanted to Know About Cryptography Legislation . . . (But Were to Sensible to Ask)*, PC world Online, Dec. 14, 1999.

Berst. *It's Baa-aack. How Interative TV is Sneaking Into Your Living Room*, The AnchorDesk, May 10, 1999.

Berst. *Why Interactive TV Won't Turn You On (Yet)*, The AnchorDesk, Jul. 13, 1999.

Borland and Davis. *US West Plans Web Services on TV*, CNETNews.com, Nov. 22, 1999.

Brown. *Let PC Technology Be Your TV Guide*, PC Magazine, Jun. 7, 1999.

Brown. *Interactive TV: The Sequel*, NewMedia, Feb. 10, 1998.

Cline. Déjà vu —*Will Interactive TV Make It This Time Around?*, DevHead, Jul. 9, 1999.

Crouch. *TV Channels on the Web*, PC World, Sep. 15, 1999.

D'Amico. *Interactive TV Gets $99 set-top box*, IDG.net, Oct. 6, 1999.

Davis. *Satellite Systems Gear Up for Interactive TV Fight*, CNETNews.com, Sep. 30, 1999.

Diederich. *Web TV Data Gathering Raises Privacy Concerns*, ComputerWorld, Oct. 13, 1998.

*EchoStar, MediaX Mix Interactive Multimedia With Interactive Television*, PRNews Wire, Jan. 11, 1999.

Furger. *The Internet Meets the Couch Potato*, PCWorld, Oct. 1996.

*Hong Kong Comes First with Interactive TV*, SCI-TECH, Dec. 4, 1997.

Needle. *Will The Net Kill Network TV?* PC World Online, Mar. 10, 1999.

Kane. *AOL-Tivo: You've Got Interactive TV*, ZDNN, Aug. 17, 1999.

Kay. *E-Mail in Your Kitchen*, Pc World Online, 093/28/96.

Kenny. *TV Meets Internet*, PC World Online, Mar. 28, 1996.

Linderholm. *Avatar Debuts Home Theater PC*, PC World Online, Dec. 1, 1999.

Rohde. *Gates Touts Interactive TV*, InfoWorld, Oct. 14, 1999.

Ross. *Broadcasters Use TV Signals to Send Data*, PC World Oct. 1996.

Stewart. *Interactive Television at Home: Television Meets the Internet*, Aug. 1998.

Wilson. *U.S. West Revisits Interactive TV*, Interactive Week, Nov. 28, 1999.

\* cited by examiner

INTEGRATION OF CONTACT CENTER SURVEYS

BACKGROUND

Contact center agents communicate with customers in a variety of scenarios. By way of example, a customer may contact a contact center in order to receive consumer support services related to a purchased product. In response, a contact center agent typically interacts with the customer to acquire enough information so that the customer's requests can be accommodated. Such interaction may be via telephone, Internet, chat and messenger, and/or email. As should be understood, the training, skills and experience of a contact center agent can dramatically affect the manner in which this interaction takes place.

In this regard, significant management resources can be devoted to ensuring that contact center agents are properly evaluated and trained. For instance, contact center agents typically are evaluated by quality monitoring personnel, such as supervisors. These supervisors oftentimes review audio recordings or desktop events of the interactions between the contact center agents and customers, resulting in some form of quality scoring by the supervisor. The scoring is indicative of the performance characteristics of the contact center agents and can be used to schedule a contact center agent for training. For example, if the scoring indicates that a contact center agent is a substandard performer with respect to a particular skill set, the contact center agent can be assigned training for improving that skill set. Thus, there remains a need for an actionable contact center survey system and method.

SUMMARY

Systems and methods for integrating actionable contact center surveys are provided. In this regard, an exemplary embodiment of such a method comprises: obtaining performance data pertaining to a contact center agent, the agent being designated to assist a customer of the contact center; providing a survey to the customer; receiving survey data responsive to the survey and corresponding to interaction with the customer by the contact center agent; and correlating the performance data with the survey data. Therefore, for example, if customers communicate dissatisfaction with a specific interaction, event, policy, or process, this may be correlated with performance data and/or shared with the relevant operating area to ensure a timely response, without upsetting more customers.

In an enhancement, if, for example, a customer is dissatisfied, the system of the representative method above may transfer the unhappy customer back to a contact center supervisor so that the problem/dissatisfaction can be immediately addressed before the conclusion of the customer's interaction with the contact center. This real-time actionable intervention based on survey responses allows for a contact center to turn a bad experience into a positive experience.

An exemplary embodiment of a system for integrating contact center surveys comprises a quality monitoring system, a data repository and a survey system. The quality monitoring system is operative to obtain performance data pertaining to a contact center agent, the agent being designated to assist a customer of the contact center. The data repository is configured to store the performance data obtained by the quality monitoring system. The survey system is operative to provide a survey to the customer, to receive survey data responsive to the survey and corresponding to the contact center agent, and to provide the survey data to the data repository. The quality monitoring system is further operative to access the data repository and correlate the performance data with the survey data. This, therefore, allows for immediate insights into threats and opportunities.

In an enhancement, the quality monitoring system may further analyze the survey data to identify when customer satisfaction drops below a predefined threshold. This may be done in real-time or near real-time, such as within minutes or hours. Yet in another enhancement, the system provides at least one actionable report, item or alert for the contact center based on at least the survey data or the correlation of the performance data and the survey data.

Computer-readable media also are provided. In this regard, an exemplary embodiment of a computer-readable medium includes a computer program that comprises computer-executable instructions for performing the computer-implemented steps of: obtaining performance data pertaining to a contact center agent; providing a survey to a customer of the contact center agent; receiving survey data responsive to the survey and corresponding to the contact center agent; and correlating the performance data with the survey data.

Other systems, methods, features and/or advantages of this disclosure will be or may become apparent to one with skill in the art upon examination of the following drawings and detailed description. It is intended that all such additional systems, methods, features and/or advantages be included within this description and be within the scope of the present disclosure.

BRIEF DESCRIPTION

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

DETAILED DESCRIPTION

As will be described here with reference to several exemplary embodiments, systems and methods for integrating contact center surveys are provided. In this regard, some embodiments can potentially provide one or more perceived advantages over conventional contact center operations. By way of example, at least some embodiments provide the ability to correlate customer responses with monitoring personnel (supervisor) scoring. That is, customer responses pertaining to the quality of contact center interactions with one or more contact center agents can be obtained. The responses then can be correlated with supervisor scoring of the contact center agents that interact with the customers. In so doing, various anomalies can potentially be detected. For instance, if customer responses tend to vary dramatically from the supervisor scoring, such an anomaly could indicate supervisor scoring bias or latent deficiencies in contact handling procedures. In some embodiments, information corresponding to customer responses is obtained by use of a survey that can be provided in various formats, such as an interactive voice response (IVR) survey. In other embodiments, various other formats of surveys, such as email, web-based, mail or courier-based and live agent callback, can be used.

Notably, the desire to provide a customer with a survey may be based, at least in part, on historical data associated with an agent. For instance, if a particular agent has been experiencing difficulty in a particular skill set, such a product knowledge, historical data pertaining to this lack of knowledge should be available. This historical data could then be used to provide a customer with a survey that is intended to determine whether the customer's interaction with the agent also indicates a lack of product knowledge. Multiple surveys provided to multiple customers could provide the basis for trend analysis to determine whether the agent was improving in this or other skill sets, for example.

Figure 1:
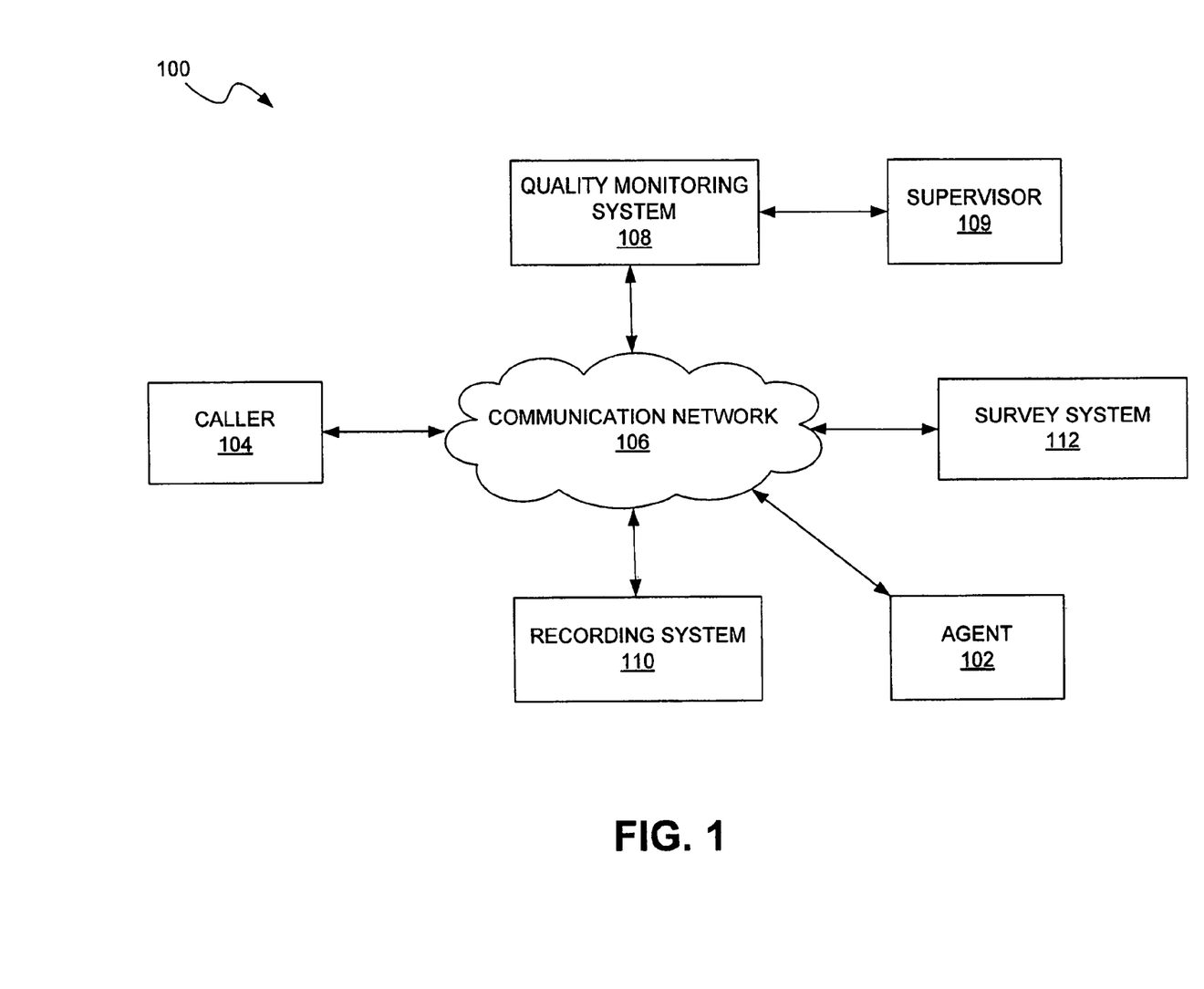
FIG. 1 is a schematic diagram illustrating an exemplary embodiment of a system for integrating contact center surveys.

Referring now to the drawings, FIG. 1 is a schematic diagram illustrating an exemplary embodiment of a system for integrating contact center surveys. In particular, system 100 involves interaction between contact center agent 102 and a customer 104 via a communication network 106. Note that network can include one or more of various communication systems including the Internet and PSTN, for example. System 100 also incorporates a quality monitoring system 108 that enables a supervisor 109, for example, to monitor various aspects of the interaction between the agent and the customer. In addition, the quality monitoring system can facilitate scheduling and training of the agents.

A recording system 110 is able to record at least some of the interactions between the customer and one or more of the agents involved, in this case, agent 102. For instance, the recording system is configured to record audio communications occurring between the customer and agent. In other embodiments, various other facets of such an interaction could be recorded. By way of example, one or more display screens of data can be captured from the computer that the agent is using during the interaction.

In this embodiment, recording of communications is facilitated when the customer is to participate in a survey. That is, when a survey is to be provided to the customer for obtaining responses pertaining to the customer's interactions with the contact center agent, the recording system ensures that communications associated with those interactions are recorded.

In other embodiments, recording of communications could take place whether or not a survey is to be provided to a customer. Such recording can be screen, e.g., desktop events, and/or voice/audio. However, provisions for ensuring that recordings can be correlated with any acquired survey data should be used, such as by tagging the recordings and the survey data with a form of identification.

In the embodiment of FIG. 1, designation of a particular customer for being provided with a survey, as well as providing of the survey itself, is facilitated by a survey system 112, representative functionality of which will be described in detail later. Notably, however, other embodiments could use various other systems and/or combinations of systems to facilitate designation of a customer and/or administration of such a survey. By way of example, a rules engine associated with a quality monitoring system could be used.

Figure 2:
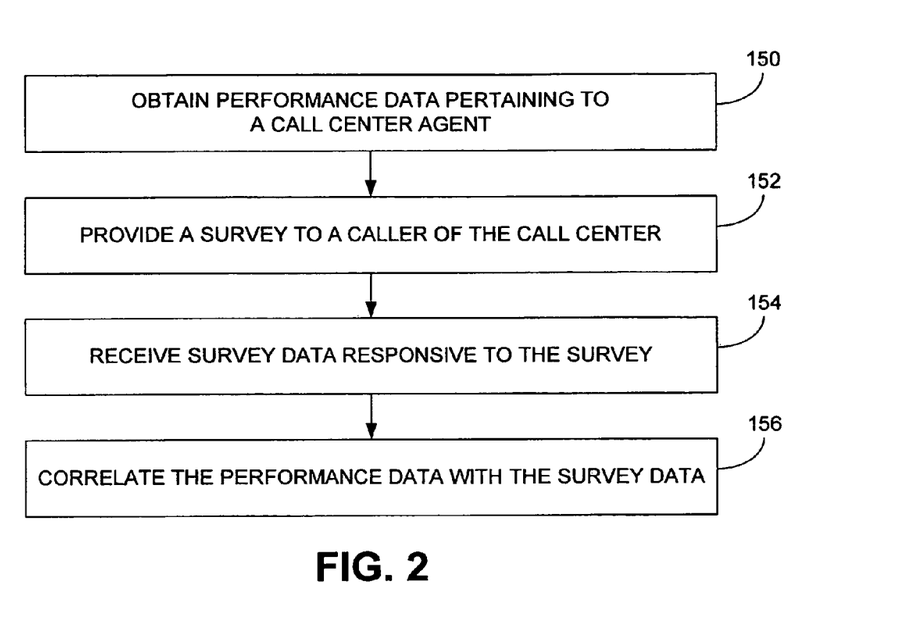
FIG. 2 is a flowchart illustrating functionality (or method steps) that can be performed by an exemplary embodiment of a system for integrating contact center surveys.

In this regard, FIG. 2 is a flowchart illustrating functionality (or method steps) that can be performed by the embodiment of the system for integrating contact center surveys of FIG. 1. In particular, the functionality may be construed as beginning at block 150, where historical performance data pertaining to a contact center agent is obtained. By way of example, such performance data can include data representative of various performance characteristics of an agent, such as product knowledge. Such performance data can be obtained by inputs provided to a quality monitoring system, such as by a supervisor of the agent.

In block 152, a survey is provided to a customer of the contact center. Notably, interaction between the agent and the customer could take place before a survey is given. However, pre-interaction surveys, intra-interaction surveys and/or post interaction surveys could be provided. In some embodiments, the format of the survey could depend, at least in part, on the time that a survey is given. For example, a pre-interaction survey given in response to a contact could be provided via an IVR survey. In contrast, a post-interaction survey could be provided via email, for example.

In block 154, survey data responsive to the survey is received. Preferably, the survey data includes information pertaining to the customer's interaction with the agent, such as data indicating whether the agent appeared to have sufficient product knowledge to answer the customer's questions, for example. Additionally or alternatively, various other types of information can be obtained.

In block 156, the performance data can be correlated with the survey data. As mentioned before, the survey data can be correlated with the performance data for various purposes. By way of example, the correlated data can be analyzed to determine whether internal (supervisor) quality scoring procedures are consistent with customer responses. Notably, most conventional contact center monitoring systems permit quality scoring of contact center agents by supervisors. However, correlating third party data, such as customer responses to surveys, has not been utilized to determine whether the internal scoring is an accurate measure of contact center agent performance. Additionally or alternatively, processing algorithms can be used to identify scores (or elements of scores) that seem to be out of sync with the customer perception captured in the survey.

Figure 3:
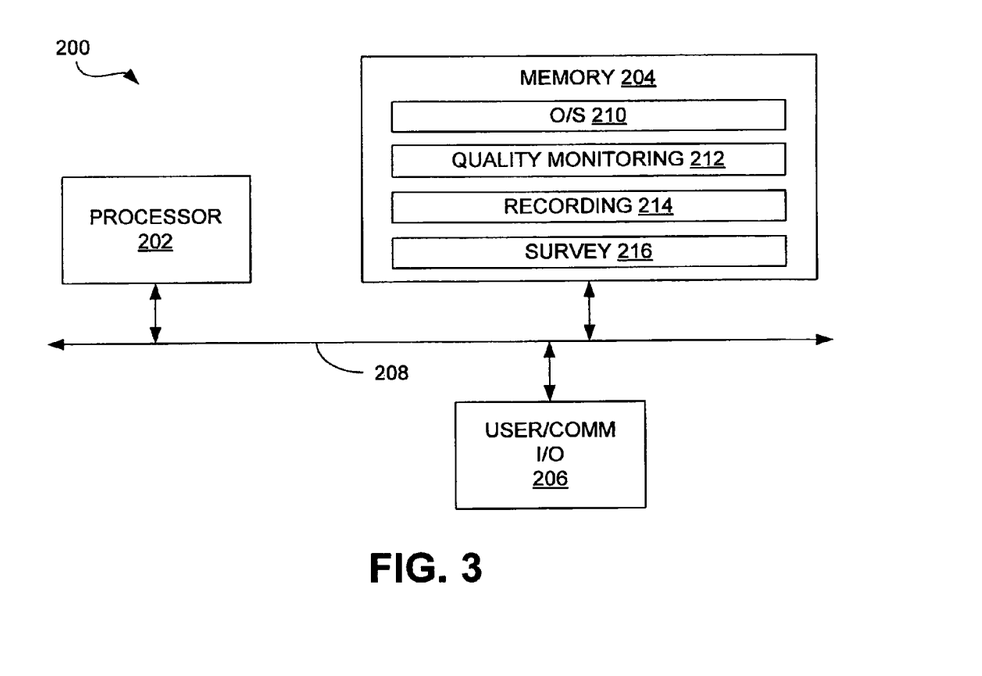
FIG. 3 is a schematic diagram illustrating an embodiment of a computer-implemented system that can be used for performing functionality, such as the functionality depicted in FIG. 2.

FIG. 3 is a schematic diagram illustrating an embodiment of a computer-implemented system that can be used for performing various functions associated with a system for integrating contact center surveys. Notably, although this embodiment involves a single platform performing multiple functions, other embodiments can involve distributed architectures that include various components distributed across multiple systems.

Generally, in terms of hardware architecture, system 200 includes a processor 202, a memory 204, and one or more user and/or communication (I/O) device interface(s) 206 that are communicatively coupled via a local interface 208. The local interface can include, for example but not limited to, one or more buses or other wired or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among the aforementioned components. The processor may be a hardware device for executing software, particularly software stored in memory.

The processor can be any custom made or commercially available processor, a central processing unit (CPU), an auxiliary processor among several processors associated with the recorder, a semiconductor based microprocessor (in the form of a microchip or chip set), a macroprocessor, or generally any device for executing software instructions. Examples of suitable commercially available microprocessors are as follows: a PA-RISC series microprocessor from Hewlett-Packard® Company, an 80×86 or Pentium® series microprocessor from Intel® Corporation, a PowerPC® microprocessor from IBM®, a Sparc® microprocessor from Sun Microsystems®, Inc, or a 68xxx series microprocessor from Motorola® Corporation.

The memory can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory may incorporate electronic, magnetic, optical, and/or other types of storage media. Note that the memory (as well as various other components) can have a distributed architecture, where various components are situated remote from one another, but can be accessed by the processor 202. Additionally, memory 204 can also include an operating system 210, as well as instructions associated with various subsystems, such as a quality monitoring system 212, a recording system 214 and a survey system 216.

The software in memory may include one or more separate programs, each of which includes an ordered listing of executable instructions for implementing logical functions. In this regard, a nonexhaustive list of examples of suitable commercially available operating systems is as follows: (a) a Windows® operating system available from Microsoft® Corporation; (b) a Netware® operating system available from Novell®, Inc.; (c) a Macintosh® operating system available from Apple® Computer, Inc.; (d) a UNIX operating system, which is available for purchase from many vendors, such as the Hewlett-Packard® Company, Sun Microsystems®, Inc., and AT&T® Corporation; (e) a LINUX operating system, which is freeware that is readily available on the Internet 100; (f) a run time Vxworks® operating system from WindRiver® Systems, Inc.; or (g) an appliance-based operating system, such as that implemented in handheld computers or personal data assistants (PDAs) (e.g., PalmOS® available from Palm® Computing, Inc., and Windows CE® available from Microsoft® Corporation). The operating system 486 can be configured to control the execution of other computer programs and provides scheduling, input-communication control, file and data management, memory management, and communication control and/or related services.

A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory, so as to operate properly in connection with the operating system.

When the system for integrating contact center surveys 200 is in operation, the processor is configured to execute software stored within the memory, to communicate data to and from the memory, and to generally control operations of the system pursuant to the software. Software in memory, in whole or in part, is read by the processor, perhaps buffered, and then executed.

Figure 4:
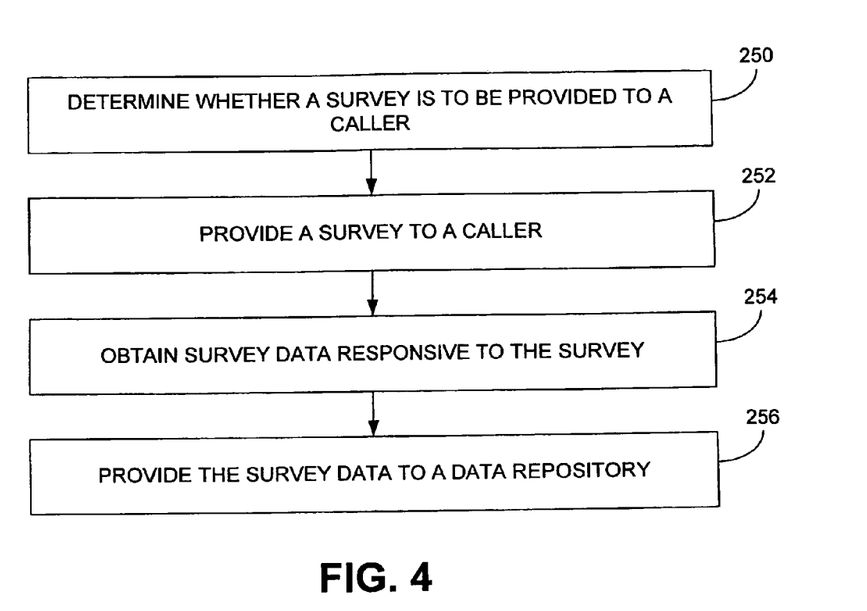
FIG. 4 is flowchart illustrating functionality (or method steps) that can be performed by an exemplary embodiment of a quality monitoring system.

FIG. 4 is a flowchart illustrating functionality associated with the embodiment of the system of FIG. 3. Specifically, the functionality depicted in FIG. 4 is associated with the survey system 216. In this regard, the functionality may be construed as beginning at block 250, where a determination is made as to whether a survey is to be provided to a customer. In block 252, if it is determined that a survey is to be provided, such a survey is provided to the customer. In block 254, survey data responsive to the survey is obtained and, thereafter, such as depicted in block 256, the survey data is provided to a data repository. By way of example, the survey data can be provided to a memory device so that the survey data can be stored and accessed for later use.

Figure 5:
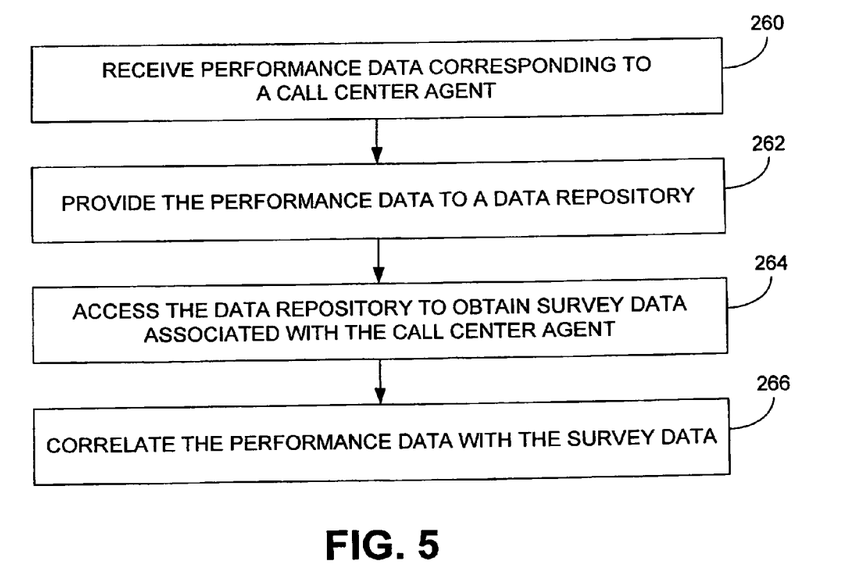
FIG. 5 is flowchart illustrating functionality (or method steps) that can be performed by an exemplary embodiment of a survey system.

FIG. 5 is a flowchart illustrating additional functionality associated with the embodiment of FIG. 3. Specifically, the functionality depicted in FIG. 4 is associated with the quality monitoring system 212. In this regard, the functionality may be construed as beginning at block 260, wherein performance data corresponding to a contact center agent is received. For instance, the performance data can include a quality score associated with a performance characteristic of an agent.

In block 262, the performance data is provided to a data repository. In block 264, the data repository is accessed to obtain survey data associated with the contact center agent. Thereafter, such as depicted in block 266, the performance data is correlated with the survey data. By way of example, an element of a quality score for an agent corresponding to product knowledge can be correlated with survey data relevant to the perceived level of product knowledge of that agent during an interaction with the customer.

Figure 6:
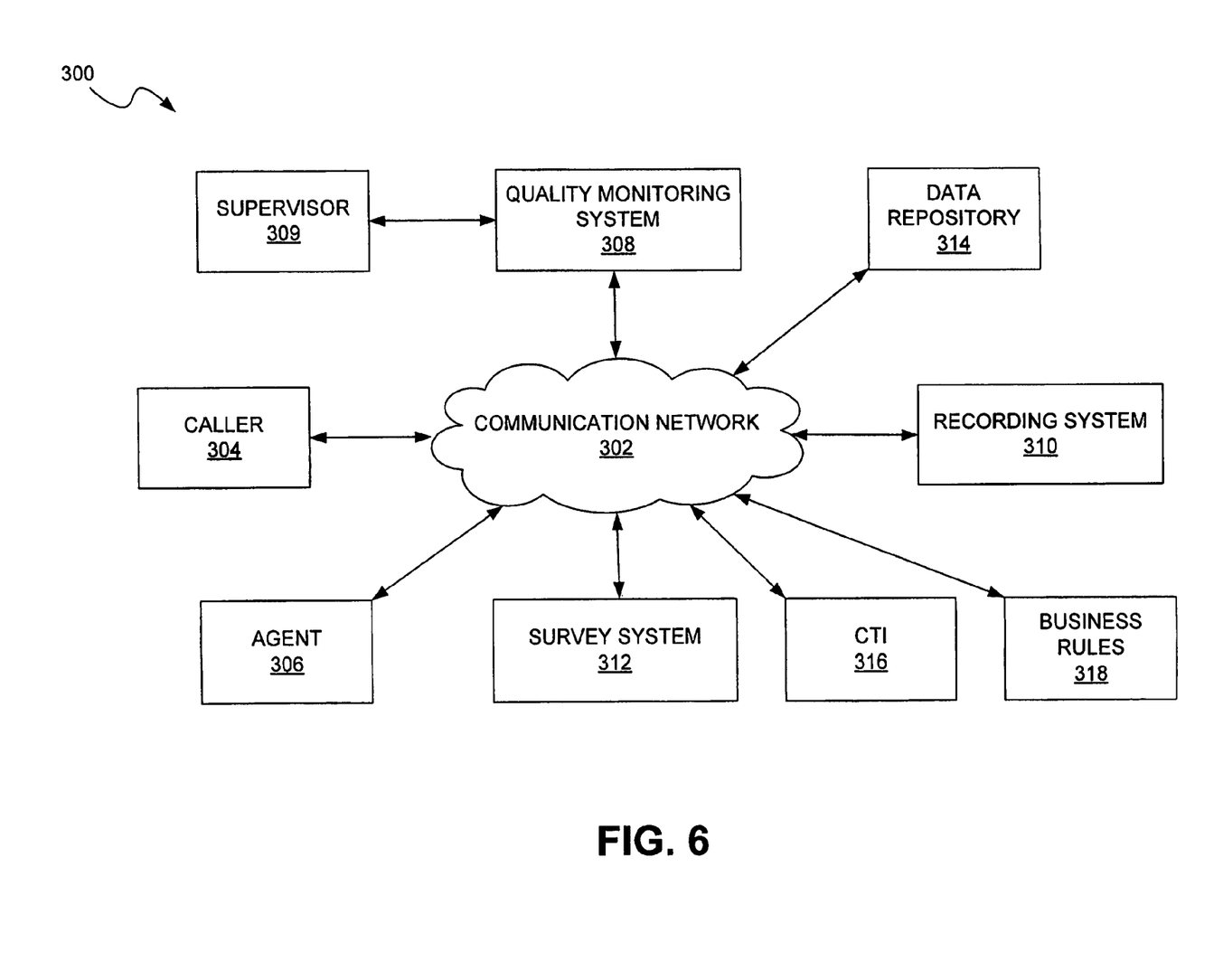
FIG. 6 is a schematic diagram illustrating another exemplary embodiment of a system for integrating contact center surveys.

FIG. 6 is a schematic diagram illustrating another exemplary embodiment of a system for integrating contact center surveys. In particular, system 300 utilizes a communication network 302 that facilitates interaction of various callers and agents, such as customer 304 and agent 306. System 300 also incorporates a quality monitoring system 308 that enables monitoring of the interactions of the callers and agents, such as by a supervisor 309. The system also incorporates a recording system 310, survey system 312, data repository 314, computer telephony integration (CTI) 316 and business rules engine 318 that facilitate enhanced quality monitoring as will be described below.

In operation, customer 304 connects to a contact center associated with system 300, thereby notifying the CTI 316 of the incoming contact. The recording system 310 and CTI interact to determine whether the interaction, e.g., the incoming contact, is to be recorded. As will be described in more detail later, this determination can be based, at least in part, on whether a survey is to be provided to the customer. However, regardless of whether the recording system is to record the interaction, the contact is connected to agent 306.

In this embodiment, at the end of the agent interaction with the customer, an instruction is provided to the agent to transfer the contact to the survey system 312. This is accomplished by functionality associated with the CTI and business rules engine. By way of example, an agent involved in the interaction may have received low quality scoring relating to product knowledge. If it is determined that the current interaction involves product knowledge (as may be determined by the particular display screens of information that the agent is accessing during the interaction), a determination may be made to provide the customer with a survey. Note that such a survey need not be tailored to specifically address historically noted deficiencies in the agent (in this case, lack of product knowledge), although such could be addressed in some embodiments.

Once the contact is transferred, the survey system queries the customer about his experience with the contact center, such as the interactions with the contact center agent. Responses to the survey are converted to survey data, which can be in the form of scaled scores or "yes/no" responses, for example. The survey data corresponding to the customer's responses are then provided to the data repository 314. In some embodiments, providing of the survey data to the data repository can be facilitated, at least in part, by the recording system 310. Specifically, the recording system can be responsible for identifying the survey data so that a correlation can be made between any recording associated with the customer and the survey data obtained from the customer.

Once the survey data has been obtained, the quality monitoring system can be utilized for analysis and/or review. By way of example, processing algorithms can be used to correlate the survey data with other information, such as performance data pertaining to the contact center agent associated with the customer that responded to the survey. With respect to reviewing of the data, the quality monitoring system can enable a supervisor to access the stored survey data and compare that data to results of agent scoring, for example, which could have been previously provided to the data repository.

Figure 7:
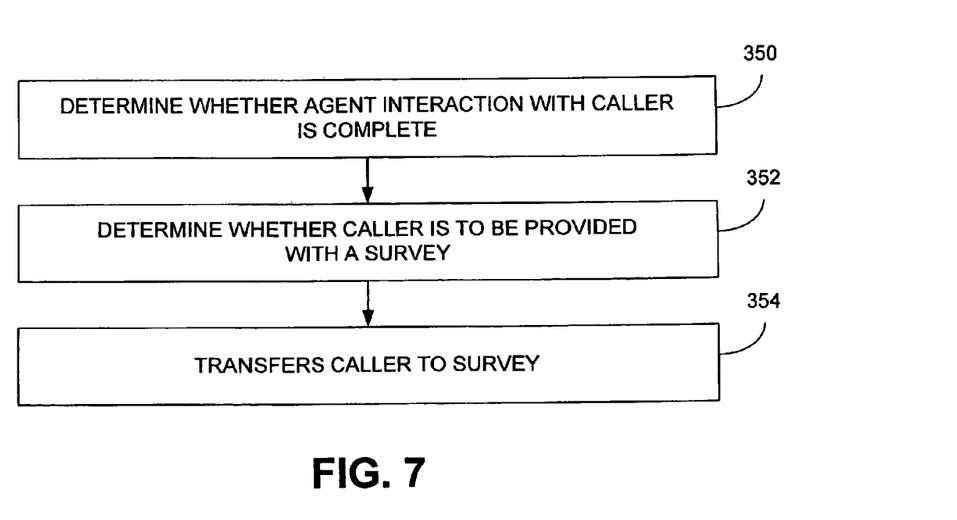
FIGS. 7-10 are flowcharts illustrating functionality (or method steps) associated with exemplary embodiments of systems for integrating contact center surveys.

FIG. 7 is a flowchart illustrating functionality associated with the embodiment of FIG. 6. Specifically, the functionality depicted in FIG. 7 relates to an implementation in which a contact is manually transferred to a survey.

In this regard, the functionality may be construed as beginning at block 350, where a determination is made as to whether agent interaction with a customer is nearing completion or is complete. By way of example, such a determination can be based on application driven events that are known to occur near the completion of an interaction. In block 352, a determination is made as to whether the customer is to be provided with a survey. In some embodiments, an agent can explicitly ask a customer regarding willingness to participate in a survey. In other embodiments, an agent may check the status of a customer's response to a survey opt-in query or programmatically be notified that the customer is to participate in a survey. That is, if a customer has been previously queried regarding willingness to participate in a survey, that information can be provided to the agent. By way of example, a pop-up or other notification can be provided to the agent notifying that agent that the customer is to participate in a survey. In this embodiment, once a determination is made that the customer is to participate in a survey, the agent manually transfers the contact to the survey, such as depicted in block 354.

Figure 8:
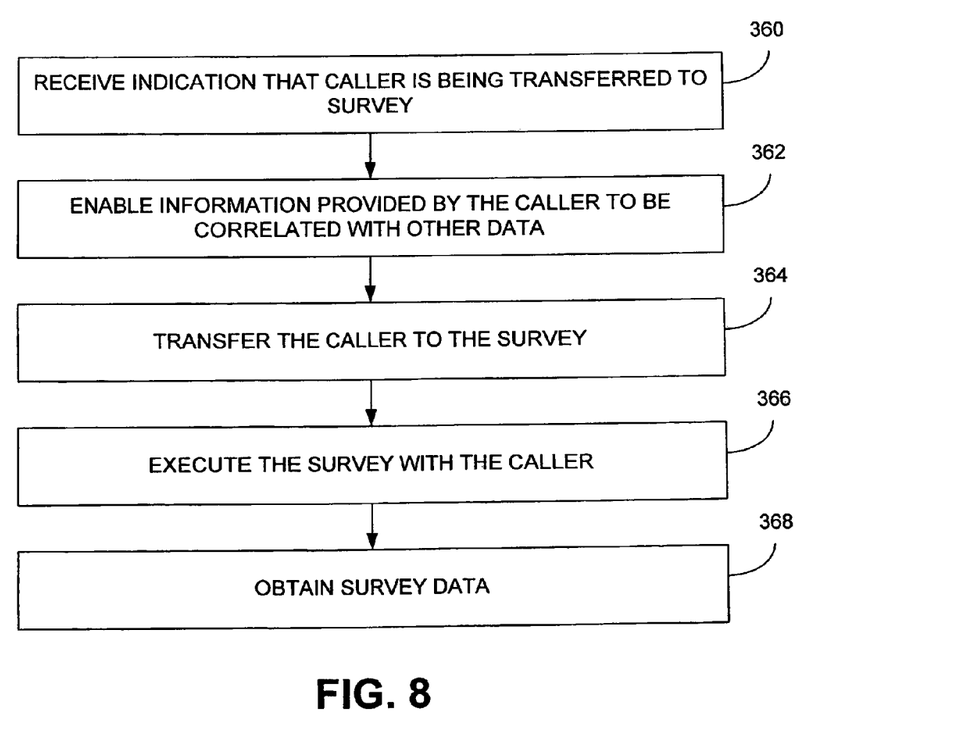

FIG. 8 is another flowchart illustrating functionality associated with the embodiment of FIG. 6. Specifically, the functionality depicted in FIG. 8 is associated with enabling survey data to be correlated with other information. In this regard, the functionality may be construed as beginning at block 360, where an indication that a customer is being transferred to a survey is received. In block 362, information provided by the customer is enabled to be correlated with other data. In some embodiments, this can be accomplished by a transfer process attaching an identifier to the transfer so that survey data provided by the customer can by synched up with results (such as future survey data, for example) that are later provided to the quality monitoring system.

After the appropriate steps have been taken to ensure that the obtained data can be correlated, the customer is transferred to the survey (block 364). In block 366, the survey is executed with the customer and, thereafter (block 368), survey data is obtained.

Figure 9:
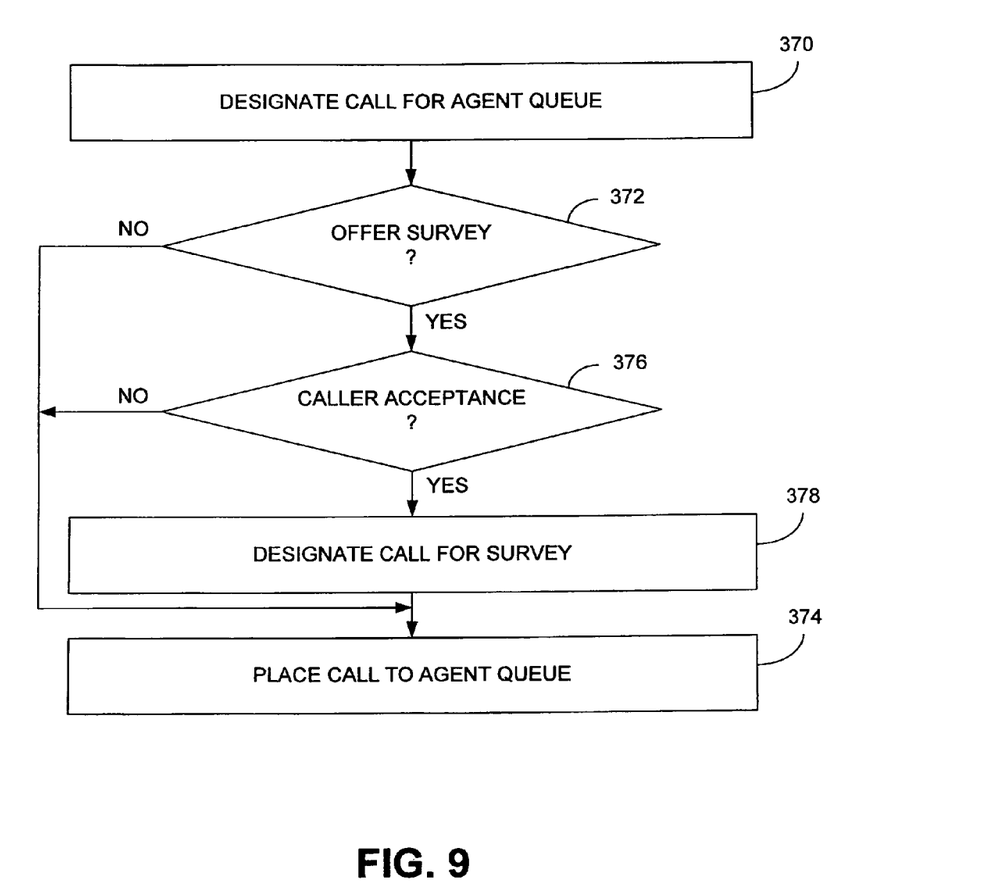

FIG. 9 is another flowchart illustrating functionality associated with the embodiment of FIG. 6. Specifically, the functionality depicted in FIG. 9 is associated with use of a customer opt-in procedure during which a customer is queried as to their desire to participate in a survey. In this regard, the functionality may be construed as beginning at block 370, where a contact is designated for an agent queue. A determination is then made, such as depicted in block 372, as to whether a survey is to be offered to the customer associated with the contact. In some embodiments, this determination can be facilitated by referring to business rules, such as those provided by a business rules engine, and/or historical contact data pertaining to the customer and/or agent. Such data could include historical agent performance, customer satisfaction information and level/status of customer. This information may be gathered from quality monitoring and/or customer relationship management systems.

If it is determined in block 372 that a survey is not to be offered, the contact can be placed in the agent queue for routing to an available agent, such as depicted in block 374. However, if it is determined that a survey is to be offered, the process may proceed to block 376, in which a determination can be made as to whether the customer accepted the survey offer. If the customer declined the survey offer, the process can proceed as described before with respect to block 374. However, if the customer accepts the survey offer, the process can proceed to block 378.

In block 378, the contact can be designated for a survey. In some embodiments, this can include updating information contained with or associated to the contact via CTI or other contact routing entity so that the contact is routed to the survey following agent interaction. Notably, transfer of the contact can take place either manually, i.e., through agent interaction, or automatically, whereby the contact would be transferred to the survey once agent interaction has completed. In other embodiments, the contact could be placed in a specialized queue to facilitate survey participation. Such would likely be involved in embodiments that provide surveys via a different communication medium than the one used to facilitate the interaction. For instance, if an interaction takes place via voice communication and the survey is to be provided via a subsequent email, information pertaining to the contact could be placed in an email survey queue.

Figure 10:
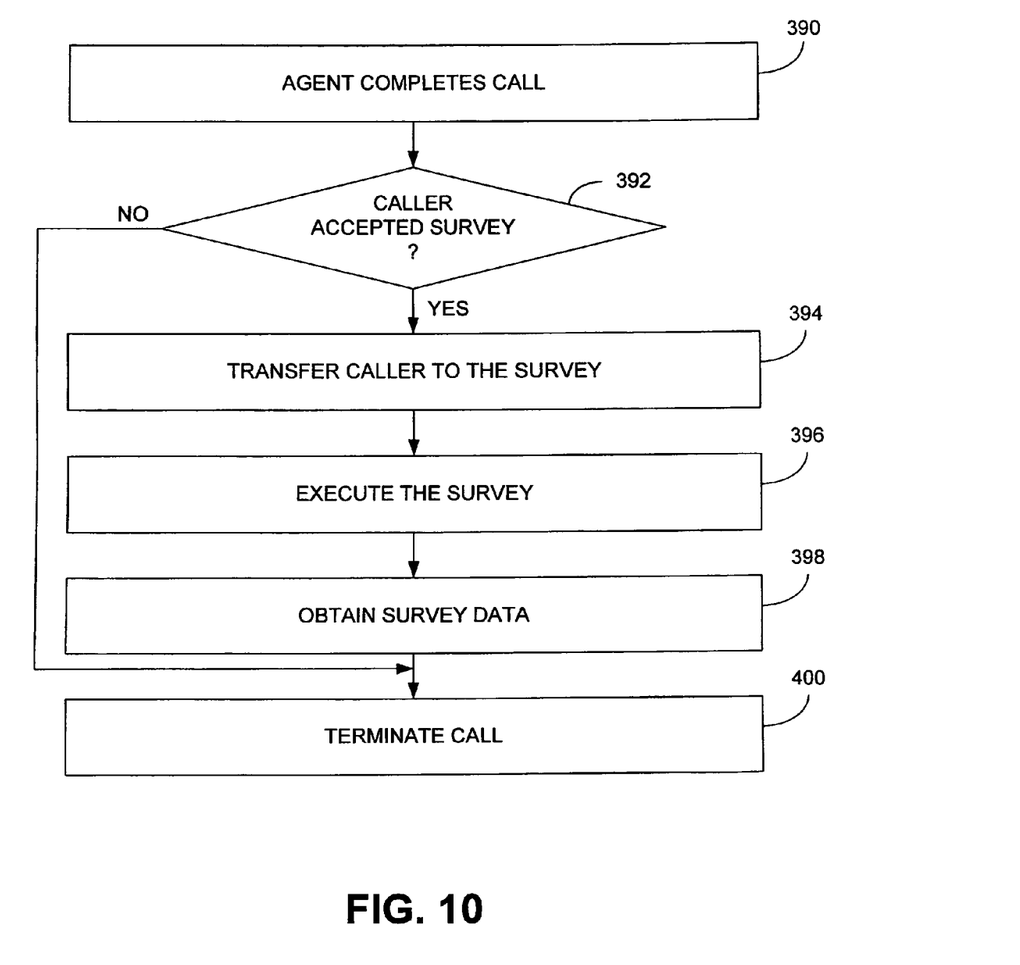

FIG. 10 is another flowchart illustrating functionality associated with the embodiment of FIG. 6. Specifically, the functionality depicted in FIG. 10 is associated with use of an automatic transfer of a contact to a survey. In this regard, the functionality may be construed as beginning at block 390, where it is determined that interaction of an agent with a customer has completed. By way of example, a determination can be made as to whether the agent has hung up the extension associated with the contact while the customer is still held on the line. In block 392, a determination is made as to whether the customer accepted to participate in a survey. As mentioned before, this determination can be facilitated by accessing information associated with a previously provided opt-in query. Irrespective of the particular manner in which such a determination is made, if the customer has accepted participation in a survey, the process can proceed to block 394, where the customer is transferred to the survey. In block 396, the survey is executed and survey data is then obtained as depicted in block 398. Typically, the survey data is stored in a data repository. As depicted in block 400, once the survey is completed, or alternatively, if the customer declined to participate in the survey, the contact is terminated.

In addition to providing surveys, integrated workforce optimization platforms can also integrate other capabilities in support of a greater customer service strategy: (1) Quality Monitoring/Contact Recording—voice of the customer; the complete customer experience across multimedia touch points; (2) Workforce Management—strategic forecasting and scheduling that drives efficiency and adherence, aids in planning, and helps facilitate optimum staffing and service levels; (3) Performance Management—key performance indicators (KPIs) and scorecards that analyze and help identify synergies, opportunities and improvement areas; (4) e-Learning—training, new information and protocol disseminated to staff, leveraging best practice customer interactions and delivering learning to support development; and/or (5) Analytics—deliver insights from customer interactions to drive business performance. These five segments can become part of an interwoven and interoperable solution, enabling contact centers to transition from reactive cost centers to proactive, information-rich departments that deliver strategic value to the organization. Workforce optimization is discussed in greater detail in the U.S. Patent Application entitled "Systems and Methods for Workforce Optimization," filed Feb. 22, 2006, and assigned Ser. No. 11/359,356, which is entirely incorporated herein by reference.

It should be noted that the flowcharts included herein show the architecture, functionality and/or operation of implementations that may be configured using software. In this regard, each block can be interpreted to represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

It should be noted that any of the executable instructions, such as those depicted functionally in the accompanying flowcharts, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of the computer-readable medium could include an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of the certain embodiments of this disclosure can include embodying the functionality described in logic embodied in hardware or software-configured mediums.

It should be emphasized that the above-described embodiments are merely possible examples of implementations, merely set forth for a clear understanding of the principles of this disclosure. Many variations and modifications may be made to the above-described embodiments without departing substantially from the spirit and principles of the disclosure. By way of example, some embodiments may not include a pre-contact opt-in mechanism. In such an embodiment, an agent may determine or be instructed to offer a survey to a customer. The instruction to offer a survey may be an operational procedure where every agent is to offer a survey on every contact, for example, or an automated one in which the system decides that a survey is to be provided. For example, such a system may dynamically decide to offer a survey based on the fact that the contact dealt with payment issues (potentially determined by application activity) and that agent has shown poor handling of payment issues based on historical quality data. All such modifications and variations are intended to be included herein within the scope of this disclosure.

Therefore, at least the following is claimed:

1. A method for integrating contact center surveys, comprising:

obtaining performance data pertaining to a contact center agent;

providing a survey to a customer of the contact center agent;

receiving survey data responsive to the survey and corresponding to interaction with the customer by the contact center agent;

correlating the performance data with the survey data; and designating a detected anomaly if it is determined that the performance data does not correspond to the survey data.

2. The method of claim 1, further comprising:

providing at least one actionable report for the contact center based on at least the survey data or the correlation of the performance data and the survey data.

3. The method of claim 1, further comprising:

querying the customer regarding participation in a survey; and responsive to a positive indication from the customer regarding participation, enabling the survey to be provided.

4. The method of claim 1, further comprising:

determining whether the survey is to be provided to the customer such that, if the survey is to be provided, communications between the customer and the contact center agent are automatically designated to be recorded.

5. The method of claim 4, wherein the recording of said interaction between the customer and the contact center agent is comprised of at least one of desktop events of the contact center agent and voice dialog between the customer and the contact center agent.

6. The method of claim 1, further comprising:

determining whether the performance data corresponds to the survey data.

7. The method of claim 6, further comprising:

scheduling the contact center agent for training, the training being selected based, at least in part, on the survey data.

8. The method of claim 1, wherein, in designating the detected anomaly, information corresponding to the anomaly is displayed to monitoring personnel.

9. The method of claim 1, wherein the performance data comprises scoring, provided by monitoring personnel associated with the contact center agent, the scoring corresponding to performance characteristics of the contact center agent.

10. The method of claim 1, wherein the survey data comprises responses of the customer pertaining to interaction of the customer and the contact center agent.

11. The method of claim 1, wherein providing the survey comprises providing an interactive voice response survey.

12. The method of claim 1, wherein providing the survey comprises providing a web-based survey.

13. The method of claim 1, further comprising:
determining whether to provide the survey to the customer prior to permitting communication between the contact center agent and the customer.

14. The method of claim 1, wherein the contact center agent is not informed that the survey is being provided to the customer.

15. A computer-readable medium having a computer program stored thereon, the computer program comprising computer-executable instructions for performing the computer-implemented steps of:
obtaining performance data pertaining to a contact center agent;
providing a survey to a customer of the contact center agent;
receiving survey data responsive to the survey and corresponding to interaction with the customer by the contact center agent;
correlating the performance data with the survey data; and
designating a detected anomaly if it is determined that the performance data does not correspond to the survey data.

16. A system for integrating contact center surveys comprising:
a quality monitoring system operative to obtain performance data pertaining to a contact center agent;
a data repository configured to store the performance data obtained by the quality monitoring system; and
a survey system operative to provide a survey to a customer of the contact center agent, to receive survey data responsive to the survey and corresponding to interaction with the customer by the contact center agent, and to provide the survey data to the data repository;
wherein the quality monitoring system is further operative to access the data repository, correlate the performance data with the survey data, and designate a detected anomaly if it is determined that the performance data does not correspond to the survey data.

17. The system of claim 16, wherein the quality monitoring system is operative to analyze the survey data to identify when customer satisfaction drops below a predefined threshold.

18. The system of claim 16, further comprising:
means for recording communications between the customer and the contact center agent.

19. The system of claim 16, further comprising:
a recording system operative to record communications between the customer and the contact center agent.

20. The system of claim 16, wherein the survey system is operative to determine whether to provide the survey to the customer prior to the customer communicating with the contact center agent.

21. The system of claim 16, wherein the survey system is operative to indicate to the contact center agent that the customer is to be provided with the survey.

22. The system of claim 16, wherein the survey system is operative to provide the survey as an interactive voice response survey.

23. The system of claim 16, further comprising:
a computer telephony integration system operative to facilitate communication between the customer with the contact center agent.

* * * * *